United States Patent
Day et al.

(10) Patent No.: US 8,323,015 B2
(45) Date of Patent: Dec. 4, 2012

(54) APPARATUS FOR DISPENSING VISUALLY ATTRACTIVE, FRESHLY PREPARED EXTRUDED FAT-BASED CONFECTIONERY PRODUCT WITH TEMPORARY FLEXIBILITY HAVING ENHANCED MELT-IN-THE-MOUTH PROPERTIES

(75) Inventors: Arthur Day, York (GB); Nicholas Tyers Parsons, York (GB); Stephen Thomas Beckett, York (GB); Hooman Ovaici, York (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 12/914,503

(22) Filed: Oct. 28, 2010

(65) Prior Publication Data
US 2011/0097434 A1 Apr. 28, 2011

Related U.S. Application Data

(62) Division of application No. 10/555,725, filed as application No. PCT/EP2004/048333 on May 6, 2004, now abandoned.

(30) Foreign Application Priority Data

May 6, 2003 (EP) .................................... 03010217
Mar. 24, 2004 (EP) .................................... 04007066

(51) Int. Cl.
*B29C 47/10* (2006.01)
(52) U.S. Cl. .................... 425/131.1; 425/145; 425/205; 425/376.1; 425/461
(58) Field of Classification Search ............. 425/131.1, 425/145, 205, 207, 376.1, 461
See application file for complete search history.

(56) References Cited

U.S. PATENT DOCUMENTS

| 2,634,691 | A | * | 4/1953 | Flockhart | 425/133.1 |
| 5,205,206 | A | * | 4/1993 | Kitama et al. | 99/326 |
| 6,764,701 | B1 | * | 7/2004 | Mochizuki et al. | 426/233 |
| 2002/0063353 | A1 | * | 5/2002 | Paetzold et al. | 264/39 |

FOREIGN PATENT DOCUMENTS

| DE | 3436578 | 1/1986 |
| EP | 0321449 | 6/1989 |
| EP | 0366978 | 5/1990 |
| EP | 0502697 | 9/1992 |
| EP | 0603467 | 6/1994 |
| EP | 0775446 | 5/1997 |
| EP | 0808576 | 11/1997 |
| EP | 0820701 | 1/1998 |
| WO | WO 00/69288 | * 11/2000 |

* cited by examiner

*Primary Examiner* — Yogendra Gupta
*Assistant Examiner* — Joseph Leyson
(74) *Attorney, Agent, or Firm* — K&L Gates LLP

(57) ABSTRACT

The invention relates to an apparatus adapted to deliver a fat based confectionery product on demand, in a foodservice or household environment, which exhibits play value and enhanced decorative attributes. The apparatus of the invention comprises barrel means for receiving a predetermined amount of fat based confectionery material, a pressure engaging means for engaging under pressure the fat based confectionery material contained in the barrel means. The apparatus further comprises die means arranged for producing at least one elongated strand of the fat based confectionery product of a surface-area-to-mass ratio that is higher than 8.0 $cm^2$ per gram unit, and control means for actuating the pressure engaging means with the barrel means upon the push of a button and for extruding the at least one strand of the fat based confectionery.

14 Claims, 7 Drawing Sheets

APPARATUS FOR DISPENSING VISUALLY ATTRACTIVE, FRESHLY PREPARED EXTRUDED FAT-BASED CONFECTIONERY PRODUCT WITH TEMPORARY FLEXIBILITY HAVING ENHANCED MELT-IN-THE-MOUTH PROPERTIES

CROSS REFERENCE TO RELATED APPLICATIONS

This application is a divisional of U.S. application Ser. No. 10/555,725, filed Nov. 7, 2005, now abandoned which is a U.S. National Phase of PCT/EP04/04833, filed on May 6, 2004, which claims priority to European Patent Application Numbers 03010217.2, filed May 6, 2003 and 04007066.6, filed Mar. 24, 2004, the content of which is expressly incorporated herein by reference thereto.

BACKGROUND

The present invention relates to a novel and visually attractive fat-based confectionery product with enhanced melt-in-the-mouth properties as compared to traditional confectionery products and which can be conveniently and rapidly prepared in front of consumers on demand. The invention also relates to a method and apparatus for dispensing such a product in a very convenient, versatile and rapid way. The invention finds a particular application in foodservice locations such as restaurants, fast foods outlets, canteens and convenient stores where there is an increasing demand for innovative food.

To date, the range of fat based confectionery such as chocolate and chocolate-like products (later called "chocolate" for simplification) offered in foodservice locations remains very traditional. The vast majority of fat-based confectionery products are produced in chocolate manufacturing plants, packaged and offered for sale on shelves at the foodservice outlet. Therefore, whereas they are successful in stores where consumers buy them to eat them later or on-the-go, they are less successful in restaurants or commercial locations where food, ice creams or beverages are offered in different varieties such as in menus or on demand.

In some foodservice outlets, fat-based confectionery is sometimes used as a liquid topping or decoration for covering or accompanying some particular foods such as sundaes, cakes or waffles. The fat-based confectionery is usually a liquid sugar and chocolate-based mixture served from containers by a foodservice operator and which gives a sensation of liquid chocolate either hot or cold. However, the taste is usually far from the incomparable taste of solid chocolate and its attractiveness is rather limited as such.

In other occasions, solid chocolate can be served to accompany food or beverage items. For example, coffee beverages may traditionally be served together with a small amount of solid dark or milk chocolate such as chocolate buttons or wrapped mini-slabs. Coffee usually marries well and enhances the taste of chocolate which makes this combination traditionally successful. However, this combination is rather marginal and this is not utilizing all the potential attractiveness of chocolate within a wider offer, either as such or in combination with other foods and beverages.

There is also a growing trend for consumers to enjoy watching food being prepared freshly for them, examples are visible espresso machines in cafés, in-store bakeries and flamboyant pizza dough preparation and baking. Watching the food or beverage being prepared adds to the consumer's enjoyment, and the consumers' perception of its value increases because they know it is fresh and specially prepared for them. Although consumers can watch confectioners forming and decorating chocolate confectionery, they cannot eat or buy the result immediately as the chocolate has to be cooled under controlled conditions to solidify it before it can actually be handled. Typically, there is at least a twenty-minute delay before a freshly created chocolate confectionery item can be handled and eaten by the consumer, by which time most consumers will have lost interest or will have purchased items previously prepared.

Liquid or solid chocolate that is usually proposed for combination with food products is not freshly formed which may be detrimental, especially, when it is combined with freshly dispensed products such as warm waffles, croissants or ice creams.

Many consumers, whether children or adults, enjoy being able to play with their meal or drink accompaniments. For example, chocolates served with coffee are often presented in a foil wrapper, and many people gain additional relaxation and pleasure from being able to twist the foil wrapper into a variety of shapes. Children are also well known to enjoy having items to play with accompanying their food. Fast food outlets often supply meals which include a toy for this purpose. To date, there are very few chocolate meal or drink accompaniments which have this "play value". Chocolates in animal or character shapes may provide entertainment for a while, but there is no opportunity to bend and shape the chocolate as it is not flexible and so the consumer's interaction with the product is limited.

Fats are known which allow a chocolate-like material to be made flexible. EP 0502697 describes a flexible chocolate composition having improved flexing characteristics and moldability. However, this composition uses a fat rich in di-saturated mono-linoleate triglycerides which cannot be legally described as chocolate in most countries. In addition, because a special composition is required to achieve the flexible effect, consumers cannot experience their favorite chocolate and chocolate-like products in a flexible state.

Food products in the form of long flexible strands such as tagliatelle, spaghetti, linguine or noodles are visually attractive and part of the pleasure of eating them derives from the ability to twist them and gather them up before putting them in the mouth. Processes for producing chocolate strands are known. EP0321449 describes a process for producing chocolate filaments from supercooled liquid chocolate to form a self-supporting, frangible, open lattice structure of discrete filaments. However, once set, the product is rigid and breaks easily in many small pieces if manipulated.

Chocolate vermicelli are also well known as short strands of chocolate used to decorate cakes and ice-cream, and these are produced by pushing tempered liquid chocolate through a sieve to form thin strands. Chocolate vermicelli for food service applications is produced in bulk by the manufacturers, packaged and sent to the food service outlet for addition to food products.

For both chocolate vermicelli and chocolate strands produced according to EP0321449 the chocolate cannot be handled until after it has been cooled for many minutes to solidify it. Once cooled, the chocolate produced in these conventional ways is not flexible so it is never in a state where it can both be physically handled and is flexible.

An important food service outlet for chocolate is for chocolate which is then combined with ice cream. Consumers often have favourite chocolate products with distinctive tastes which they would like to eat together with ice cream. The melting speed and viscosity of chocolate affects its perceived flavour as is described in S. T. Beckett, The Science of Chocolate, Chapter 5, RSC 2000. When popular chocolates are eaten together with ice cream, the low temperature reduces their melting speed and so changes their flavour. Often the chocolate is so hard when combined with ice cream that it shatters into pieces in the mouth which are swallowed before they have had a chance to melt in the mouth and release any flavour. Chocolates can be reformulated with higher fat contents and lower melting point fats to increase their melting rate and so improve their flavour with ice cream. However, if these products are then picked out of the ice-cream and allowed to warm up, the consumer is disappointed that they do not have the taste and texture of their favourite product, and often are so soft that they are difficult to handle and are likely to make a mess of children's clothing. In addition, some consumers have favourite chocolate products which they do not wish to contain fats other than cocoa butter.

A rapid melting chocolate provides an enjoyable sensation in the mouth. The melting sensation itself is pleasurable, but then the mouth is rapidly cleared of chocolate giving a clean eating sensation. A rapid melting chocolate is especially advantageous when the chocolate is combined with a freshly served food or beverage in order to compensate for the relatively dry taste or purely liquid taste of the accompanied item.

Chocolate in a liquid form does not melt in the mouth, and so the eating satisfaction is much reduced. It also has the disadvantage that it can easily drip off the food. For instance, when served on top of ice cream, liquid does not stay long in place and can more easily smear on hands of the consumer. Liquid chocolate also does not serve well with beverages such as coffee for instance. Furthermore, it cannot be shaped into attractive forms and does not add much to the attractive appearance of the food it is on except that people can immediately recognize its presence or not on the food. Liquid chocolate cannot be picked up and handled and if touched causes very sticky fingers.

EP 0775446 relates to an extrusion process and extruding apparatus for forming a continuous lattice structure of chocolate by applying pressure to the chocolate or fat-containing confectionery material in a solid or semi-solid non-pourable form. The product is formed of a cellular or honeycomb structure obtained from a particularly complex die arrangement comprising a network of pins and parallel slots. As a result, this particular organized lattice structure would exhibit a certain degree of temporary flexibility but cannot be bent round on itself. In particular, such structure could not be coiled onto a surface to form long strands without breaking.

SUMMARY

Therefore, there is a need for a novel fat based confectionery product that can be delivered rapidly and conveniently and which offers the advantages of enhanced ability to melt-in-the-mouth compared to traditional solid fat based confectionery product but, at the same time, can be shaped in various different attractive forms and can be manipulated without significantly sticking to the hands in order to offer a certain play value.

There is also a need for a melt-in-the-mouth effect that lasts more than a few seconds after the product has been produced since delivery times to the consumer at the foodservice location may be very variable depending on various factors like traffic, peak hours, drive-in orders, etc.

There is also a need for a product that has a sufficiently rapid melt in the mouth to provide a good flavour when combined with, and at the temperature of, ice cream.

There is also a need for a product that gives the appearance and sensation of a freshly formed product.

There is also a need for a product that does not drip off the food when combined to it.

There is also a need for a product that provides a light feeling in the mouth having the property of being able to fill a large empty volume with a minimum mass of material.

There is also a need for a novel fat based confectionery product which the consumer can handle before eating.

There is also a need for a product that can use any typical chocolate compositions which are appreciated by consumers and can be labeled "chocolate".

There is a need for a product that provides the sensation of an important volume of product as compared to its actual mass to provide attractive and decorative attributes.

There is a need for a product that is adapted for being consumed alone or combined to various types of food and beverages to make, for example, a topping or a decoration.

For that, the present invention relates to a fat based confectionery product formed of at least one elongated strand of extrudate of fat based confectionery material the at least one strand of extrudate is capable of being physically handled while exhibiting a temporary flexibility comprising in that the strand of extrudate is formed to a surface area-to-mass ratio that is higher than 8.0 cm$^2$ per gram unit with the at least one strand having a continuous total length that is higher than 80 mm and the at least one strand has a curled configuration forming a continuous strand of a plurality of curls which is randomly coiled on a receiving surface without the strand breaking.

We found surprisingly that the combination of the shape in the elongated strand configuration, the flexibility of the extrudate and the increased surface area-to-mass ratio obtained by extrusion, all together provided a remarkable temporary, more rapid melt-in-the-mouth ability. This ability is also combined to other advantages which are the remarkable external volume occupied by such a resulting product when coiled into a receptacle or onto a surface which far exceeds the usual volume of a typical moulded article and, therefore, its ability to provide a light feeling and also to decorate in many different ways any sorts of food item associated therewith, for example, a waffle, a cake, a pancake, other pastries, or an ice cream, etc. Also the extrudate can be manipulated by the consumer and is in the form of visually attractive long strands. The faster melt-in-the-mouth property is a particular advantage when the chocolate product is combined with ice cream as it improves flavour delivery at the temperature of ice-cream.

More preferably, the at least one strand of the extrudate has a surface area-to-mass ratio that is higher than 10.0 cm$^2$ per gram unit and a continuous length that is higher than 80 mm. Most preferably, the surface area-to-mass ratio is comprised between about 11.0 cm$^2$ and 30 cm$^2$ per gram unit. More preferably, the at least one strand has a length greater than 100 mm and, even possibly greater than 500 mm. Most preferably, the length of the at least one strand is of from 100 to 1000 mm.

The strand can be randomly coiled on the receiving surface as one discrete piece or several separate pieces thus resulting in an open intermeshed structure of confectionery product on the receiving surface.

The surface-area-to-mass ratio represents the total area at the external surface of the strand for one gram of product. The surface area of the strand directly depends on the perimeter of the die section of the extruder and the length of the extruded product. The surface area of a strand can be obtained by the general formula: {[strand length]×[die profile perimeter length]}+{2×[die profile cross section]}.

Within these ranges of lengths and surface area-to-mass ratios and because also the fat based material has a certain flexibility when it is delivered, the at least one strand forms into a curled configuration with the strand forming a continuous piece of a plurality of curls. The advantage is that even a little mass of product has the ability to occupy a relatively large volume. Therefore, the product provides a visual effect of material mass but stays light. The product can, for instance, be coiled onto a food surface or in a container and be ready for consumption as such. The at least one strand is thus coiled freely on a support surface without forming a predetermined outer shape. The support surface may be a food surface such as ice cream, pastry ands the like or a non-edible surface such as a cup or glass lid.

Therefore, the combination of the curled configuration of strand(s), the high surface-to-mass ratio and high ability to flex, provides a product with a large volume occupancy when lying onto a food surface or within a container.

The volume occupancy is reflected by the volume naturally occupied by the product per mass unit. In particular, the volume occupancy of the product onto a food surface or in a container is higher than 2.5 cm$^3$/g, more preferably higher than 3.0 cm$^3$/g, most preferably between 3.5 cm$^3$/g to 10 cm$^3$/g. The volume occupancy of the product is determined by measuring the volume naturally occupied by the product after it is coiled onto the food surface or within a container. For instance, a mass of less than 30 grams of fat based material as readily obtained in one or more strands can occupy a natural volume of more than 100 cm$^3$. Apart from the enhancement of the visual impact, the high volume to mass ratio also provides a light feeling in the mouth comparable to aerated confectionery products. The light feeling is related to how easily the teeth cut through the product as the jaws close, and how easily they are released as the jaws open. As a matter of comparison, a solid chocolate has a volume occupancy typically of about 0.8 cm$^3$/g and requires more effort to bite through and so has a heavier eat. In contrast a bundle of chocolate strands in the mouth has substantial air space and so requires little effort for the bite and opening the jaws and so gives more pleasurable light eat, particularly when combined with the rapid melt.

The extrudate is preferably formed by freshly extruding of a solid mass of fat confectionery material which is pressed under pressure through a die and at a temperature of the mass less than 30° C., later referred as "cold extrusion", and by serving the freshly extruded strand or strands before the temporary flexibility ceases thereby providing an enhanced melt-in-the-mouth effect. Freshly extruding of the fat based confectionery material combined to a higher surface area-to-mass ratio causes it to melt more rapidly in the mouth than the same material served later or compared to a material of lower surface area-to-mass ratio.

"Cold extrusion" refers to the process described in EP 0603 467 B1, the entirety of which is hereby incorporated by reference. EP 0603 467 B1 discloses a process for plastically extruding a fat-containing confectionery material which comprises feeding the fat-containing confectionery material into an extruder and applying a pressure to the fat-containing confectionery material in a substantially solid or semi-solid non-pourable form upstream of a flow constriction at a temperature at which the fat-confectionery material is extruded substantially isothermally and remains in a substantially solid or semi-solid non-pourable form to produce an axially homogeneously extruded product having a cross section that is of substantially the same profile as the die of the extruder, which is capable of retaining its shape and which has a temporary flexibility or plasticity enabling it to be physically manipulated or plastically deformed before loosing its flexibility or plasticity.

The present invention takes advantage of this process to produce a freshly produced temporary ductile product with a higher surface area-to-mass ratio that provides the sensation to melt more rapidly in the mouth.

As a definition, the attribute of "flexibility" refers to a 15 cm section of extrudate strand that can be brought from a substantially straight position to a position where the two ends have been bent round to touch each other without the material developing a visible crack, substantially altering its cross-section or breaking apart.

The temporary flexibility of the strand of extrudate should last at least during 3 minutes after extrusion in order to provide the beneficial melting sensations. The flexibility is also dependent on the cross sectional shapes and the surface area-to-mass ratio; for instance, more compact shapes and lower surface area-to-mass ratio exhibiting comparatively lower flexibility properties.

The temporary flexibility of the at least one strand of extrudate is of at least 2 minutes, preferably of at least 3 minutes and most preferably between about 4 minutes and about 4 hours.

The fat based confectionery material is preferably dark, milk or white chocolate, compound or couverture. The fat based confectionery material may also include products derived from sugar with or without milk derived components, and fat and solids from vegetable or cocoa sources in differing proportions having a moisture content less than 10%, more usually less than 6% by weight. The fat-based confectionery material may include chocolate substitutes containing direct cocoa butter replacements, stearines, coconut oil, palm oil, butter or any mixture thereof; nut pastes such as peanut butter and fat; praline; confectionery's coatings also known as compounds or couvertures, used for covering ice cream or cakes usually comprising chocolate or analogues with cocoa butter replaced by a cheaper non-tempering fat; or "Caramac" sold by Nestlé comprising non-cocoa butter fats, sugar and milk. Traditional chocolate normally contains from 30 to 35 wt. % fat and in this invention, fat based confectionery material may, if desired, contain normal amounts of fat or less than the normal amount of fat present in chocolate, e.g., it may contain from 16 to 40 wt. % total fat and most preferably 26 to 40 wt. % total fat. Fats can be chosen among traditional chocolate fats such as cocoa butter and/or vegetable fats to provide product compositions with amounts of low melting tri-glycerides and ratios of triglycerides which are typical for chocolate or chocolate-like substances. In particular, the fat composition of the fat based material is determined such that flexibility is primarily obtained by the process of "cold" extrusion and does not necessarily require specific triglyceride compositions which require unusually high proportions of low melting point triglycerides. In particular, the triglyceride composition of the fat based material used for the product can contain di-saturated mono-unsaturated glycerides, where less than 20 wt. % of the di-saturated mono-unsaturated glycerides are di-saturated mono-linoleate.

It has also been found that chocolate composition played an important role for imparting temporary flexibility of the product. Therefore, in order to enable nice curled strands of chocolate to be coiled on the receiving surface without risk of breaking, the composition of the confectionery material should have a minimum amount of milk fat, preferably of at least 3% by weight and a total fat content of from 26 to 40% by weight. Milk fat has proved in the invention to confer to the final product an exceptional flexibility which can not be obtained with confectionery material containing no milk fat or a lesser amount of milk fat. In common with conventional chocolates, the particle size of cocoa solid is also preferably of less than 30 microns (the particle size value is here given for a population of at least 90% of the particles) so as to avoid a gritty texture in the mouth.

Provided the ratio surface area-to-mass ratio is respected, the cross sectional shape of the extruded strand may be a circle, a star, a triangle, a rectangle, a polygon or a non symmetrical shape. Flat surfaces of these shapes can also be slightly curved as convex or concave lines to form, for instance, rounded rectangle or polygon, without departing from the scope of the invention.

Therefore, preferred extruded shapes are circular shapes to form rods of relatively small diameters, preferably of less than 3.5 mm. Other preferred shapes are flat shapes such as ribbons of height less than 1.2 mm preferably less than 1.0 mm and width of more than 5.0 mm preferably more than 6.0 mm. Ribbons of such dimensions exhibit large surfaces for contacting with the tongue and thus melt more rapidly for providing a more pleasurable sensation in the mouth.

The fat based confectionery product of the invention may also comprise several strands of extrudate obtained by parallel extrusion and forming an extruded product of intermeshed and curled configuration of strands.

The fat based confectionery material may contain different coloured dyes in order to enhance the decorative effect. By virtue of the elongation provided on the material when passing through the die of the extruder, different degrees of colouring can be achieved such as veined or marble effects. Varying effect can be obtained by varying the dye concentration in the material and/or as by varying the operational conditions of extrusion.

The invention also relates to a food product made of the association with the fat base confectionery product as aforementioned and at least one other edible item. The edible support is ice cream, pastry, solid confectionery product, a beverage or combinations thereof. For instance, pastry may be waffles, shaped sugar wafers, cakes, croissants, pancakes, pies, etc. For instance, solid confectionery can be set chocolate or sugar supports. For instance, the beverage can be coffee, tea, chocolate, cappuccino, latte, etc. The edible item may serve itself as a support for receiving the fat based confectionery product. The support may also be made by a non-edible container. The non-edible container may be a plastic glass or cup.

In one preferred embodiment, the food product comprises a plastic container into which is received at least one strand, preferably many strands, of the fat based confectionery product. The strands of confectionery product may be given the appearance of pasta products such as spaghetti, taggliatelle, linguine, noodles or worms.

The invention also relates to the method for conveniently delivering a decorating, easy-to-handle confectionery product of enhanced melt-in-the mouth properties, at a foodservice outlet, characterized in that it comprises
forming of at least one ductile elongated strand of extrudate of fat based confectionery material which is capable of retaining its extruded cross-sectional shape and has at least a temporary flexibility; by extruding a mass of fat based confectionery material and,
depositing the at least one strand of extrudate with the at least one strand having a continuous total length that is higher than 30 mm, preferably higher than 80 mm, without the strand breaking; wherein the strand is extruded through a die to form at least one strand of surface-area-to-mass ratio that is higher than 8.0 cm$^2$ per gram unit.

In the forming step, it comprises:
providing a solid fat based confectionery mass,
submitting the solid fat based confectionery mass to a pressure in an extruder at a temperature of less than 30° C.,
passing the solid fat based confectionery mass through a die of predetermined cross section to make at least one strand of product,
optionally, cutting the strand at the desired total length and,
receiving the at least one strand in a serving container or onto a food item.

Preferably, the at least one strand, as extruded is served immediately after it is received in the container or onto the food item to retain its flexibility properties and consequently also its melting properties. By "immediately", it is meant that the serving is preferably carried out within half an hour, preferably a quarter of an hour or even less.

The invention further relates to an apparatus adapted to deliver a fat based confectionery product on demand, in a foodservice or household environment, which exhibits play value and enhanced decorative attributes.

The apparatus of the invention comprises barrel means for receiving a predetermined amount of fat based confectionery material, a pressure engaging means for engaging under pressure the fat based confectionery material contained in the barrel means, and it further comprises die means arranged for producing at least one elongated strand of the fat based confectionery product of a surface-area-to-mass ratio that is higher than 8.0 cm$^2$ per gram unit, and control means for actuating the pressure engaging means with the barrel means upon the push of a button and for extruding the at least one strand of the fat based confectionery.

The fat based confectionery material can be stored in at least on hopper. The apparatus further comprises dosing means to dose the fat based confectionery material from this, at least one, hopper. The dosing means can be an auger or any equivalent dosing system for solid, particulate, granular or powdered materials. Chute means is preferably provided to collect the dosed fat based material and funnel it into the barrel means. Such configuration enables to automatically dispense multiple fat based confectionery products in a foodservice environment, with a high reliability and efficiency.

Therefore, upon the push of a button or any equivalent selection means, the control means is configured for controlling the actuation of the dosing means to dose a fat based material from the hopper before actuating the pressure engaging means with the barrel means and extruding the at least one strand of the fat based confectionery. The dispensing is so carried out in an automatic manner rendering the operation convenient for the operator and ensuring that a fresh product; i.e., a product with a temporary flexibility, is offered to the consumer. Even more preferably, the apparatus comprises a plurality of hoppers for storing a range of fat based confectionery material to provide the additional advantage of offering a wider choice of fat based confectionery products, such as products dispensed with different favours, colours and/or tastes of product. Therefore, the dispensing from a plurality of sources of fat based confectionery material can be controlled automatically on the push of a button. For that, the control means is configured for selectively controlling the actuation of the dosing means to dose the selected fat based confectionery material from said hoppers before actuating the pressure engaging means with the barrel means upon and extruding the at least one strand of the fat based confectionery.

In order to achieve a surface area-to-mass ratio within the preferred range, the die comprises at least one outlet having a profile perimeter length which is preferably comprised between 1.6 and 200 mm, more preferably between 3 and 25 mm and most preferably between 3.3 and 19 mm.

In order to obtain strands of thin rod shapes which exhibit enhanced melting features, the die comprises an outlet of diameter of less than 3.5 mm, preferably of between 3.0 and 0.5 mm.

In order to obtain ribbons of suitable shapes and dimensions providing the enhanced melting features, the die comprises an outlet of slot shape of height less than 1.2 mm preferably less than 1.0 mm and width of more than 5.0 mm preferably more than 6.0 mm.

Preferably, the die comprises multiple outlets of individual cross sections within the aforementioned sizes and/or shapes. The outlets are preferably separated from at least 1 mm from each other in order to enable extrusion of discrete strands of extrudate and maintain the flexibility in each discrete strand.

Additional features and advantages are described herein, and will be apparent from, the following Detailed Description and the figures.

DETAILED DESCRIPTION

Figure 1:
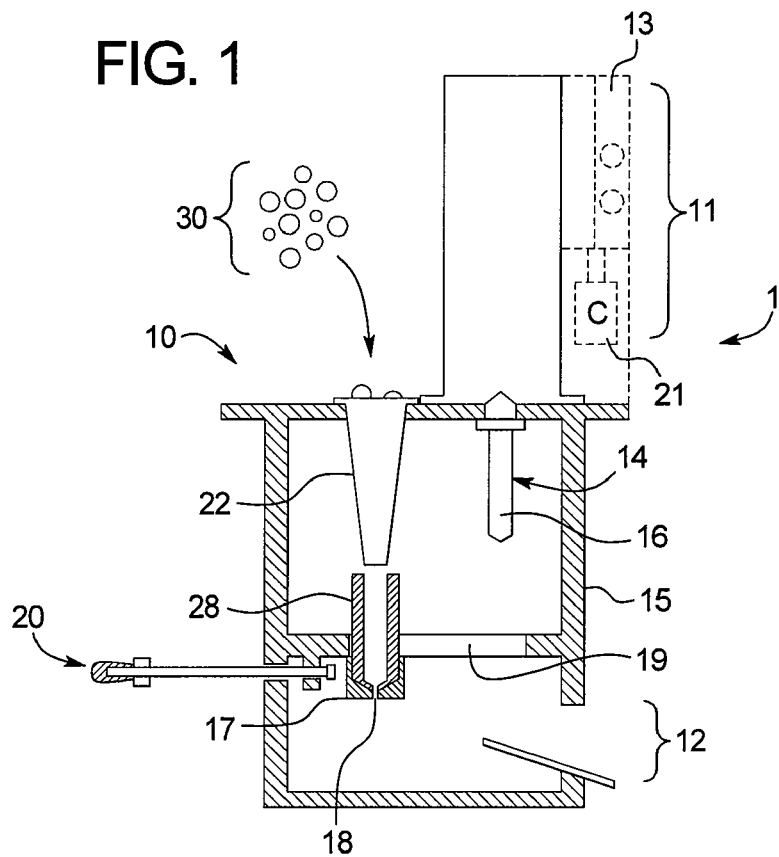
FIGS. 1 to 3 illustrate the method for extruding and dispensing fat based confectionery product of the invention using an exemplary dispensing apparatus.
Figure 2:
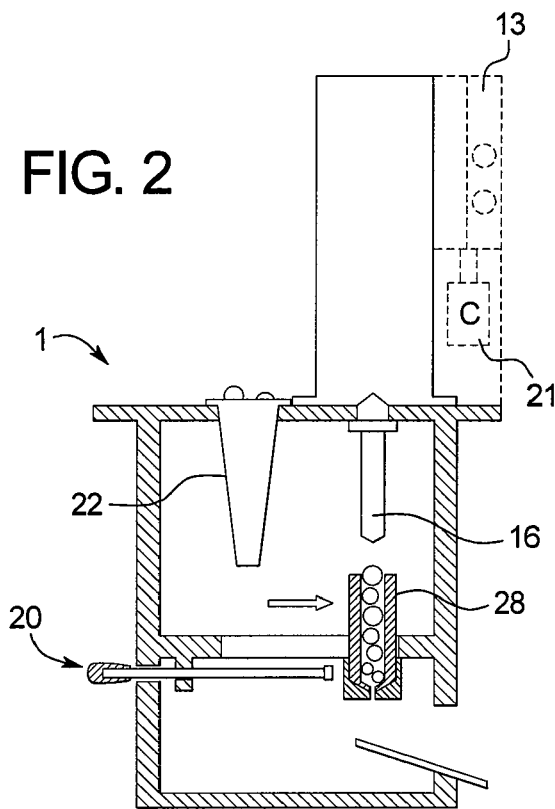
Figure 3:
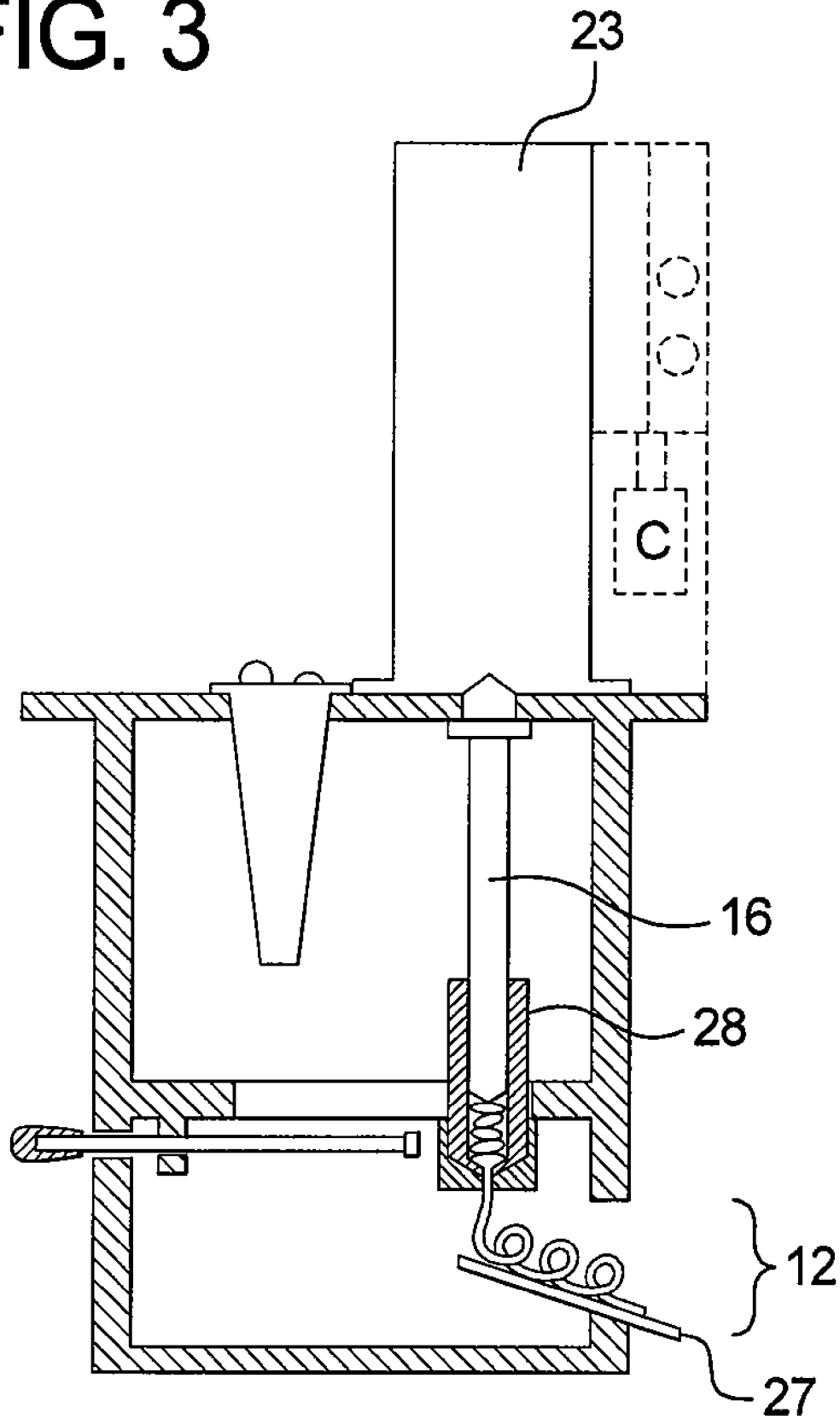

Referring to FIGS. 1 to 3, the schematic shows the basic design of the on-demand dispensing device 1 which comprises an extruder 10, a control device 11 and a serving arrangement 12. A housing may enclose the mechanisms of the system and may be used for branding and to convey to the customer the nature of the product to be sold. The control device comprises a switch board 13 with buttons or other controls for activating the extruder 10 and selecting specific products and or dispensing activities.

The extruder 10 comprises a pressure engaging system 14 mounted on a frame 15 of the device. The pressure engaging system 14 comprises preferably an electrically or hydraulically driven ram comprising a reciprocating plunger 16 intended to engage a barrel 28 of the device. An alternative pressure engaging system could be used and the ram could be replaced by a motor driven volumetric displacement screw which cooperates with the barrel.

The barrel extends at the exit end by a die 17 shaped with at least one outlet 18 to shape the desired product cross section, in particular, to achieve the high surface area-to-mass ratio necessary for the intended benefits of the invention. The die is removably connected to the barrel and is interchangeable with other dies of different outlet configuration so as to achieve a wide range of product shapes and cross sections. Rapid quick disconnecting means can be so attached to the die for a more rapid mounting. Several dies can also be positioned in a carrousel and be selected by the control means to change automatically the product configuration that is dispensed. The die may comprise one or more outlets. The outlets may encompass a wide range of cross sectional shapes such as circular, rectangular, rounded rectangular, polygonal or any other shapes. In one preferred configuration, the die has one outlet of a diameter of less than 3.5 mm to produce a single thin rod of extrudate. In another configuration, the die has multiple outlets to extrude a plurality of thin rods at a time, the diameter of each being less than 2.0 mm, and the outlets being separated from at least 1 mm from each other to extrude discrete pasta-like or worm-like strands of extrudate. In yet another configuration, the die has the shape of a slot with a height lower than 1.0 mm and a width higher than 5.0 mm to produce a ribbon of extrudate similar to "tagliatelle" pasta.

In a preferred configuration, the barrel is also made displaceable between a loading position (FIG. 1) and an extruding position (FIGS. 2 and 3) by means of a sliding arrangement including, for examples, guiding means 19 in the frame engaging with the barrel 28. The barrel can be moved in the two positions by means of a mechanical actuating system such as a pusher 20 or any other equivalent system. The barrel can be spring loaded to the frame so that when the pusher is pulled off, the barrel can automatically return in the loading position. Of course, the motion of the barrel could also be carried out by electrical means and electronic control using, for instance, a solenoid to move the barrel which is controlled by the controller 21 of the control device 11. The barrel could also be manually operated.

When in the loading area, the barrel can be charged with solid fat based confectionery material such as chocolate buttons, flakes or morsels 30. For example, the material is fed through a hopper 22 mounted to the frame above the barrel. Charging of the material in the hopper may be achieved by any means such as manually or automatically. Large solid pieces of chocolate such as bars or big chunks can also be provided as the starting material. For example, solid chocolate in the form of a solid one piece refill of chocolate can be provided which has a predetermined specific shape and size that fits the inside of the barrel. The barrel may, for instance, have a specific cross section such a polygonal (pentagonal, hexagonal, etc.) shape which complements the shape of the refill so as to guarantee only complementary shaped refills are receivable.

Optionally the barrel could be charged with a liquid fat based confectionery material which was then cooled within the barrel to solidify it before it is extruded.

The final products delivered to the consumer may also be customized by selecting variables such as the type of chocolates among a choice of different types of chocolates, the die configuration, e.g., number of outlets, shapes and cross-section, and also eventually, the extruding operational conditions, e.g., extruding time, speed, etc.

After the right material and correct amount of material has been charged, which may correspond to one or more servings of extruded product, the pusher is activated to place the filled barrel in the extruding position beneath the ram 14. In operation, the ram is then advanced at a pressure of between 5 to 200 bars, preferably 20 to 100 bars and at a temperature of the mass below 30° C., preferably of between 10 to 25° C. It is important that the product extruded through the die be kept in a semi-solid non-pourable state to form strands that can retain their shape. If the product melts completely in the extruder to form a liquid, subsequent cooling at the die outlet will not provide a flexible material which can be handled.

The barrel may additionally be maintained chilled to improve shape retainability or control the desired degree of flexibility. In particular, chilling of the barrel below ambient may be required to compensate the heat transfer from the mechanical forces, for example, by a refrigeration system that transports a cooling agent through the barrel's walls.

The pressure engaging system 14 is controlled by a controller 21 such as a PLC control which can turn on and off a motor 23 to reciprocate the ram toward the barrel 28 as a response to the activation of a button at the board 13. As shown in FIG. 3, the product comes out of the die under the form of at least one strand of chocolate which is received in the serving area 12. In a preferred embodiment, the strand is received on a sliding ramp 27 that directs it to the serving area to maintain the integrity of the strand, its curled configuration and to avoid to damage the strand. The properties of flexibility of the product combined with the ramp enables the apparatus to deliver long curled strands of product, e.g., from several centimeters to metres, without breakage or cracks occurring in the product.

Figure 4:
FIG. 4 is a photograph of a first embodiment of the confectionery product as extruded by the method of FIGS. 1 to 3 which shows a ribbon.

FIG. 4 illustrates one example of food product which can be obtained by the method of the invention. The food product is combination of an ice cream and an extruded ribbon of coloured chocolate. The food product is received in a glass cup for serving.

Figure 5:
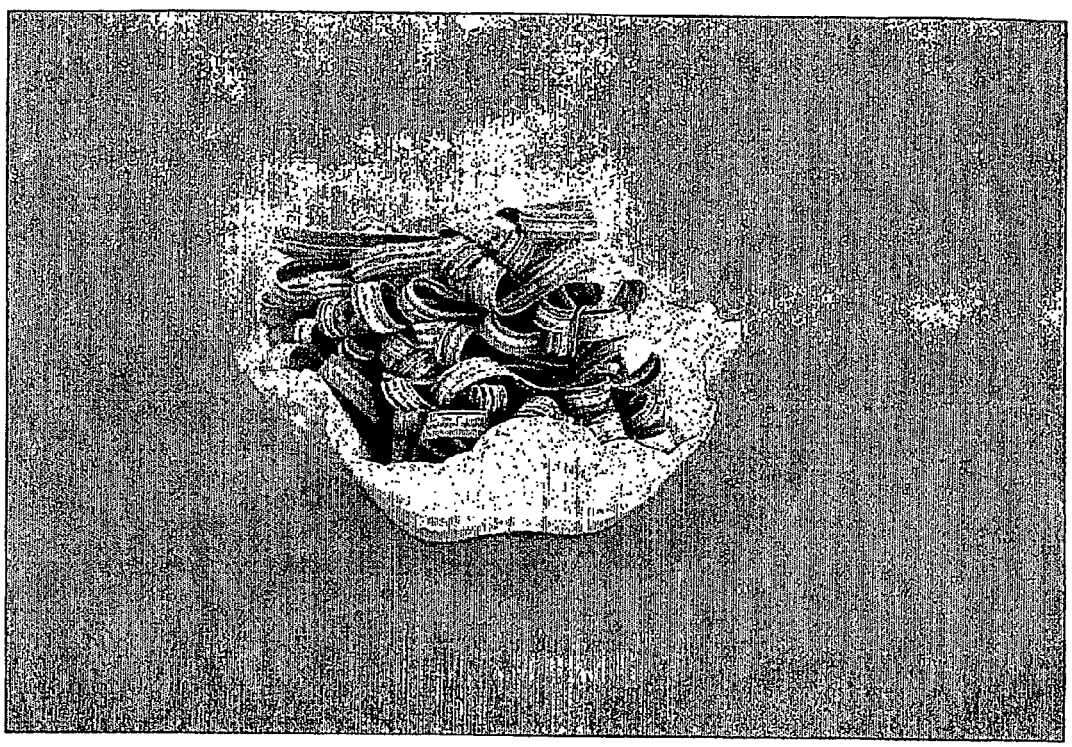
FIG. 5 is a photograph of a food product of the invention which shows a ribbon as extruded and deposited in a cup made of sugar wafer.

FIG. 5 illustrates another example with a coloured chocolate ribbon in a sugar wafer cup.

Figure 6:
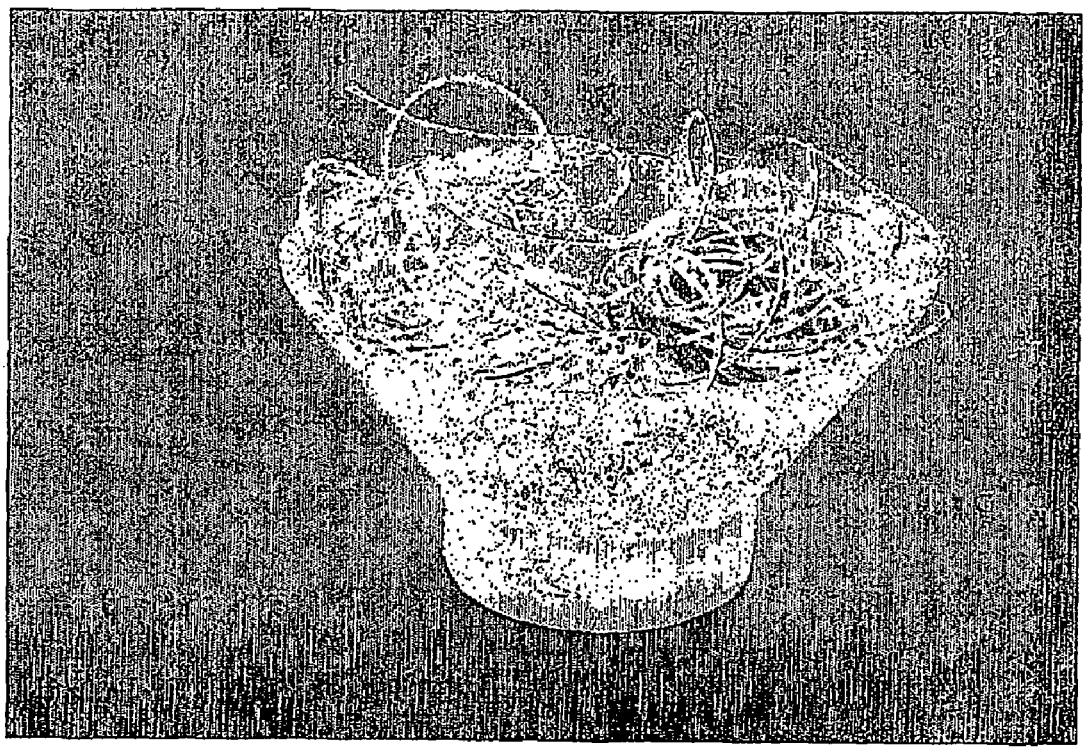
FIG. 6 is a photograph of another embodiment of the confectionery product of the invention.

FIG. 6 is another example with coloured spaghetti-like strands in a glass cup.

Figure 7:
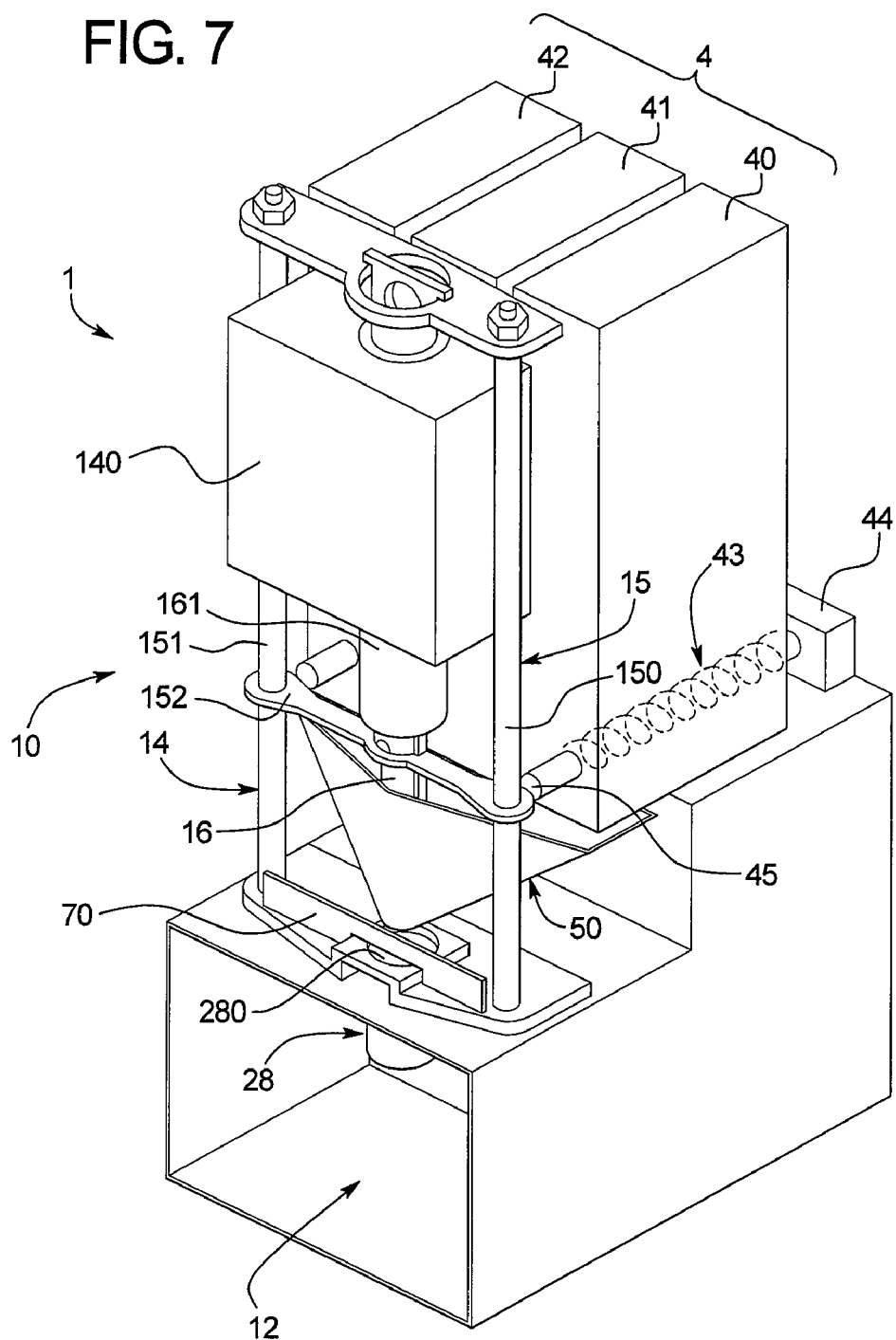
FIG. 7 is a variant of the dispensing apparatus of the invention.
Figure 8:
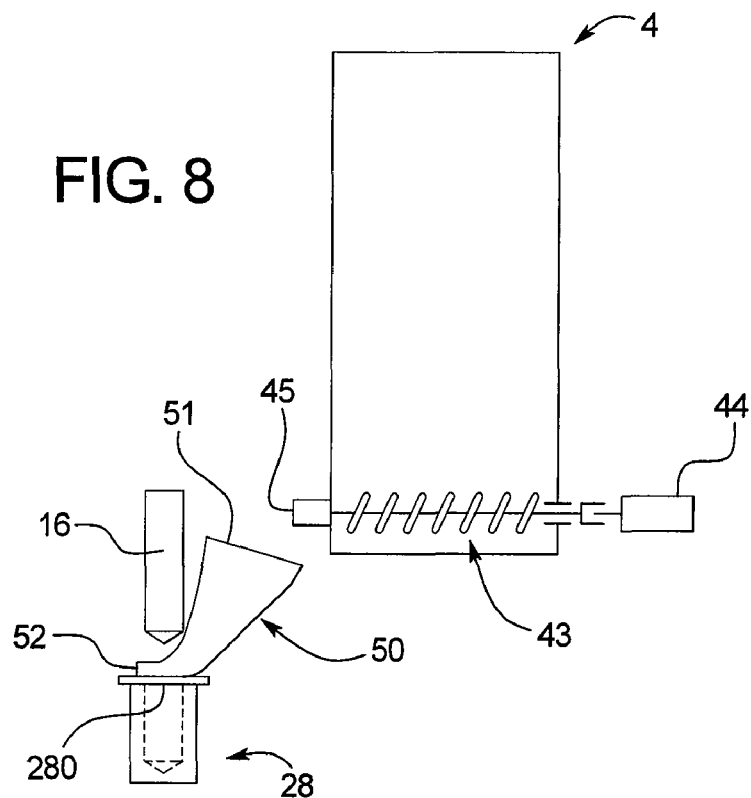
FIG. 8 is a schematic view of the dispensing apparatus of FIG. 7 during loading chocolate material into the barrel.
Figure 9:
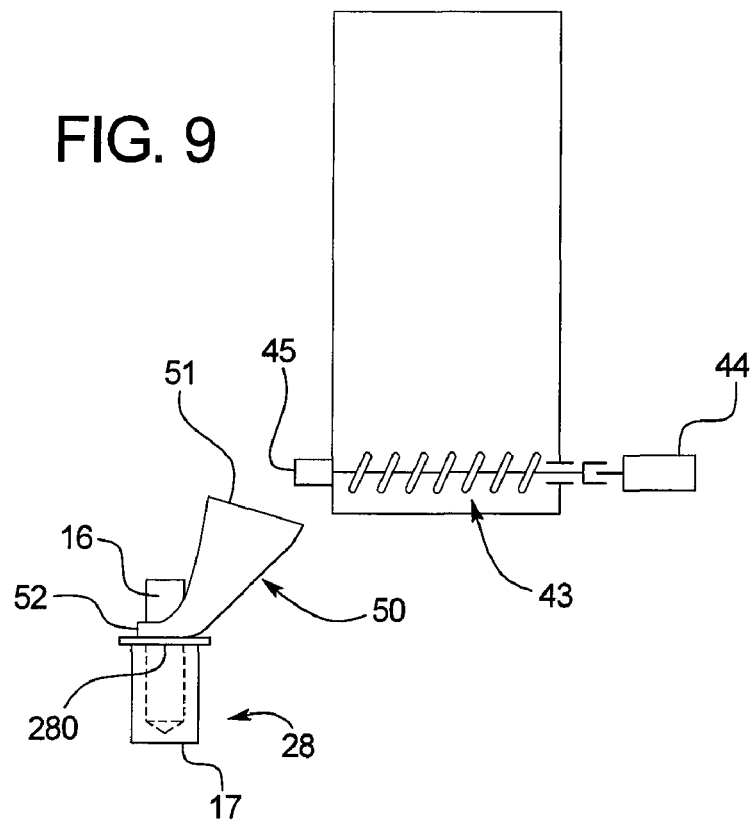
FIG. 9 is a schematic view of the dispensing apparatus of FIG. 7 during the extrusion step.

FIGS. 7 to 9 illustrate a preferred embodiment of the dispensing apparatus of the invention. The apparatus 1 comprises an extrusion assembly 10 for extruding the fat based confectionery according to the method as aforementioned, storage means 4 of fat based materials, a serving zone 12 and control means (not shown) to start and control each cycle of product delivery; from the selection and dosing steps of the fat based material to the extrusion step through the extrusion assembly and serving step of the one or more strands of fat based confectionery in the serving zone.

The storage means 4 comprises a plurality of hoppers 40, 41, 42 of sufficient capacity for storing from several hundreds grams to several kilograms of solid fat based confectionery material. The confectionery material as stored in these hoppers can be under the form of chocolate buttons, flakes, granules or powder. The hoppers are maintained at ambient temperature but could be cooled with water and/or gas cooling means to maintain the temperature at or below 25-28° C., such as in hot external environment, where a too high ambient temperature would cause the material to melt. The hopper could so be housed in a cooling jacket or in a refrigerator. The hoppers 40, 41, 42 are typically vertically oriented containers with a bottom side onto which is seated a dosing mechanism 43 configured to meter precise amounts of the fat based material. The hoppers can be formed of any suitable material such as metal, plastic and/or cardboard. The dosing mechanism can be an auger which is transversally oriented along the bottom's width of the container. The auger is driven by a motor 44 situated behind the hopper and has an outlet 45 for delivering the fat based material out of the hopper, located at the front lower end of the hopper. It can be noted that the hopper, its fat based confectionery content, and preferably with its internal auger, can form a removable confectionery package of the apparatus. This offers the opportunity to maintain this package or cartridge closed during dispensing so to improve the freshness of the confectionery material, increase the shelf stability and to also offer more convenience to the operator who does not have to refill the hopper from confectionery material stored in bulk. Means to position, maintain the package in connection with the motor 44 can be further provided to help a rapid loading of the package in the apparatus.

Each outlet 45 of the hoppers is placed above a chute means 50, thereby fat material coming out of the hoppers after dosing can be collected and funneled to a barrel means 28 of the extrusion assembly. The chute means can be configured into individual chutes to each outlet or a single large chute common to a plurality of outlets. The chute means can take various configurations without departing from the scope of the invention. The chute means can be tube(s), funnel(s), ramp (s), gutter(s) and so on.

As illustrated in FIGS. 8 and 9, the chute means 50 is configured to enable the collection of the fat based material through a widened end 51 and the delivery of such material into the barrel means 28 through a restricted end 52. The restricted end is preferably shaped in the form of a cylindrical or partly cylindrical surface which matches the barrel inlet 280 to ensure a clean and efficient loading of material in the cylinder of the barrel means. A protection plate 70 to guide and avoid uncontrolled projections of fat based confectionery material can be further provided in front of the inlet 280 of the barrel means.

The extrusion assembly 10 comprises a pressure engaging system 14 vertically connected to a frame 15 of the apparatus. The pressure engaging system is formed of an electrically powered linear actuator 140, a moveable ram 141 which actuates a piston or plunger 16. The piston can be guided in sliding movement by two vertically oriented spaced apart rods 150, 151 and a transverse brace 152. The advantage of such a mounting is primarily for allowing to achieve high pressures and drive long strokes without alignment problems of the piston and barrel.

The extrusion assembly 10 further comprises the cylinder-shaped barrel means 28 which includes a die 17 located at its lower end. The die 17 can be integral to the barrel means so that the barrel means is interchangeable or the die means can be removably fixed to the barrel means so that the die is interchangeable.

When a fat based confectionery product wants to be dispensed, the operator presses a button of the control means (not shown) which activates the dosing system 43 according to the selection made. The control means may include an electronic controller which stores the key selection parameters corresponding to the products to be dispensed. The controller can count the number of turns of the auger and shut it down when the programmed number is reached to achieve the volume dispensed in the barrel means. The dosing may also be time based, for instance. A selection may activate more than one auger, simultaneously or sequentially, in order to produce final products with variable properties such as colours, flavours, etc. Chocolate strands with portions or zones of different chocolates, e.g., black or white chocolates, can be achieved. When the barrel means is filled with the selected mass of solid confectionery material, the controller activates the pressure engaging means to press the material and to extrude the fat based confectionery strand(s) through the die. The barrel may be dimensioned to press a single serving of product or a plurality of servings.

The apparatus can take many other variants with much other functionality.

EXAMPLES

Example 1

Milk Chocolate Rod of Extrudate

Milk chocolate buttons with a fat content of 28.7% by weight and a milk fat content of 6.1% by weight were introduced in a barrel of the extruder as aforementioned and extruded at ambient temperature through a circular die aperture with a diameter of 3 mm to produce a rod-shape. This had a surface area of 10.7 cm$^2$/g. A curled strand of 50 cm long is obtained without breakage. It was possible to obtain a few strands of 300 cm long without breakage.

Example 2

Milk Chocolate Ribbon of Extrudate

The same milk chocolate used in example 1 was extruded through a slot shaped die, 0.75 mm high and 6.75 mm wide to produce a ribbon shape. This had a surface area of 23.8 cm$^2$/g. A curled strand of 100 cm long is obtained without breakage. It was also possible to obtain a few strands of 500 cm long without breakage.

Example 3

Dark Chocolate Rod of Extrudate

Dark chocolate buttons with a fat content of 28.0% but containing no milk fat were introduced in a barrel of the extruder as aforementioned and extruded at ambient temperature through a circular die aperture with a diameter of 3 mm to produce a rod-shape. This had a surface area of 10.7 cm$^2$/g. The strand was flexible enough to be directed down the sliding ramp, but tended to break on contact with the receiving vessel. Very few strands longer than 15 cm were produced without breakage.

Example 4

Dark Chocolate Ribbon of Extrudate

The same dark chocolate used in example 1 was extruded through a slot shaped die, 0.75 mm high and 6.75 mm wide to produce a ribbon shape. This had a surface area of 23.8 cm$^2$/g. The strand was flexible enough to be directed down the sliding ramp, but tended to break on contact with the receiving vessel. Very few strands longer than 20 cm were produced without breakage.

Example 5

Flexibility Tests

A 15-cm length of the extruded material was cut. The material is considered flexible if the two ends of the material can be brought from a position 15 cm apart to a position where they touch each other without the material developing a visible crack, substantially altering its cross-section or breaking apart. A fresh piece of material was used for each test.

A rod-shape was extruded as in example 1. The temperature in the room was 22±0.5° C. A series of 15 cm lengths were tested for flexibility with a minimum interval of 30 s. The last time after extrusion at which a sample was flexible was recorded. The experiment was repeated three times.

Longest time where a flexible sample of 3 mm diameter rod was found:
Trial 1: 3 minutes 30 s
Trial 2: 3 minutes
Trial 3: 4 minutes The experiment was repeated with a ribbon shape as in example 2.

Samples of this 0.75 mm thick ribbon were still flexible after 4 hours, but broke when next tested at 19 hours after extrusion.

The experiment was repeated with the dark chocolate rod of example 3 and the dark chocolate ribbon of example 4. In each case the material cracked during the first flexibility test.

Example 6

Sensory Tests

Sensory profiling was used to compare the melting time of a milk chocolate prepared in three different ways.

Sample 1. Freshly extruded example 1 (3 mm rod), tasted by the sensory panel within 10 minutes of extrusion.

Sample 2. Previously extruded example 1 (3 mm rod), extruded 5 days before the sensory session.

Sample 3. Freshly extruded example 2 (0.75 mm ribbon), tasted by the sensory panel within 10 minutes of extrusion.

Six panelists, already trained in the evaluation of chocolate products, were given specific training on extruded chocolate products for a total training period of 2 hours. The purpose of the training was to introduce the three products to the panelists and to reach an agreement on the protocol of tasting. The three products were then evaluated by the 6 trained panelists.

The products were tested in a monadic sequence (one product assessed before evaluating the next product) and assessed in three replicates. A complete randomised and balanced design was used to avoid any bias due to the presentation order. All samples were coded with 3-digit random numbers and assessed blind. Each portion of sample to be tasted was weighed (1.6+/−0.1 g) and placed on a small plastic weighing boat so that it could be tipped into the mouth in one movement. The panelists placed the chocolate between their tongue and the roof of their mouth and recorded when the chocolate had completely disappeared. Data were collected using Fizz software (Biosystemes, Version 2.00E).

The mean scores of the products (over the panel and the three replications) for the attribute melting time are indicated in Table 1.

TABLE 1

Means of the melting time of the three products (in seconds)

| | Sample 1 (Freshly extruded 3 mm rod) | Sample 2 (Previously extruded 3 mm rod) | Sample 3 (Freshly extruded 0.75 mm ribbon) |
|---|---|---|---|
| 1$^{st}$ replicate | 35.8 | 41.0 | 30.8 |
| 2$^{nd}$ replicate | 33.2 | 34.7 | 29.2 |
| 3$^{rd}$ replicate | 37.3 | 38.3 | 31.3 |
| Average | 35.4 | 38.0 | 30.4 |

A two-factor analysis of variance was conducted for the attribute melting time. The attribute melting time discriminated the three samples (with a minimum confidence level of 95%). A least significant difference test was also run. The three products were significantly different (at a minimum confidence level of 85%).

The freshly extruded 3 mm rod (sample 1) melted faster than the previously extruded 3 mm rod (sample 2). The thin ribbon (sample 3) was the quickest to melt.

Examples 7

Volume Occupancy

Ribbon as example 2 was allowed to deposit naturally into cup with a 55-mm diameter circular opening, 45-mm circular base and height of 55 mm. The internal volume of the cup was 110 cm3. The cup was filled by 17 g of ribbon. The occupancy of the ribbon lying in the cup was therefore 6.5 cm3/g.

The same chocolate was extruded through a die with three holes, each with a diameter of 1.5 mm, their centres positioned equidistant on the circumference of an imaginary circle of radius 2.5 mm. The cup was filled by 30 g of this "spaghetti-like material" (surface area 21.4 cm2/g). The occupancy of the material lying in the cup was therefore 3.7 cm3/g.

As a matter of comparison, the chocolate buttons serving as the starting material placed in the same cup had an occupancy of 1.5 cm3/g.

Example 8

Solid Content

Milk chocolate with a fat content of 32 wt. % and a milk fat content of 4.5 wt. % was extruded through a circular die aperture with a diameter of 3 mm to produce a rod-shape. Before extrusion, the chocolate temperature was 20.0° C. and the total solid content of the chocolate measured by a Bruker Minispec pc120 was 84.5 wt. %. Immediately following extrusion the chocolate temperature was 21.3° C. and within 1 minute of extrusion the solid content of the chocolate was measured as 74.8 wt. %. The Bruker Minispec pc120 was calibrated prior to use with 3 reference standards. Chocolate samples were simply placed in an NMR glass tube, introduced into the Minispec pc120 and measured with no conditioning step.

Example 9

Triglyceride Composition in Chocolate

Chocolate of example 1 was analysed by HPLC to determine its triglyceride composition.

For the chocolate used in examples 1: Triglyceride composition determined by HPLC. The triglycerides individually determined were OLL, PLL, OLO, StLL, PLO, PoOP, PLP, OOO, StLO, POO, PLSt, POP, StOO, StLSt, POSt, PPSt, StOSt, PStSt and StOA where P=Palmitic acid, Po=Palmitoleic acid, St=Stearic acid, O=Oleic acid, L=Linoleic acid, A=Arachidic acid. There was also 6.5 wt. % of other small triglycerides with an equivalent carbon number less than 46. Scaling the individually determined triglycerides to 100 wt. % 91.8 wt. % of these triglycerides were di-saturated mono-unsaturated glycerides (S2U), 6.8 wt. % were di-unsaturated mono-saturated glycerides (SU2), 0.6 wt. % were tri-unsaturated glycerides (U3) and 0.8 wt. % were tri-saturated glycerides (S3). There were 5.3% di-saturated mono-linoleates (S2L) which is 6 wt. % of the total di-saturated mono-unsaturated glycerides.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus for on demand dispensing of a fat based confectionery product comprising:
   barrel means for receiving a predetermined amount of fat based confectionery material,
   a sliding arrangement comprising a pusher for moving the barrel between a loading position and an extruding position, the sliding arrangement further comprising a guide engaging the barrel means to linearly, horizontally slide the barrel means between the loading position and the extruding position,
   a pressure engaging means for engaging under pressure the fat based confectionery material contained in the barrel means, the barrel means being vertically aligned with the pressure engaging means when in the extruding position and vertically unaligned with the pressure engaging means when in the loading position;
   die means arranged for producing at least one elongated strand of the fat based confectionery product to an area-to-mass ratio that is greater than 8.0 cm$^2$ per gram unit, and
   control means for actuating the pressure engaging means with the barrel means upon the push of a button and for extruding the at least one strand of the fat based confectionery.

2. The apparatus according to claim 1, comprising:
   at least one hopper to store the fat based confectionery material,
   dosing means to dose the fat based confectionery material from the hopper and,
   chute means to collect the dosed fat based material and funnel it into the barrel means.

3. The apparatus according to claim 2, wherein, upon a push of a button, the control means is configured for controlling the actuation of the dosing means to dose a fat based material from the hopper before actuating the pressure engaging means with the barrel means and extruding the at least one strand of the fat based confectionery.

4. The apparatus according to claim 2, comprising a plurality of hoppers for storing a range of fat based confectionery material.

5. The apparatus according to claim 4, wherein, upon a push of a button, the control means is configured for selectively controlling the actuation of the dosing means to dose the selected fat based confectionery material from said hoppers before actuating the pressure engaging means with the barrel means upon and extruding the at least one strand of the fat based confectionery.

6. The apparatus according to claim 2, wherein each dosing means is an auger.

7. The apparatus according to claim 1, wherein the die means comprises at least one outlet having a perimeter length comprised between 1.6 and 200 mm.

8. The apparatus according to claim 7, wherein the die means comprises at least one outlet having a perimeter length comprised between 3.0 and 25 mm.

9. The apparatus according to claim 1, wherein the die means comprises an outlet of diameter of less than 3.5 mm to form a rod of extrudate.

10. The apparatus according to claim 1, wherein the die means comprises an outlet of slot shape of height less than 1.2 mm and width more than 5.0 mm to produce a ribbon of extrudate.

11. The apparatus according to claim 10, wherein the die means comprises an outlet of slot shape of height less than 1.0 mm and width more than 6.0 mm to produce a ribbon of extrudate.

12. The apparatus according to claim 1, wherein the die means comprises multiple outlets of individual cross-sections, the outlets being separated from at least 1 mm from each other to extrude discrete strands of extrudate.

13. The apparatus according to claim 1, wherein the pusher is configured such that moving the pusher in a horizontal direction moves the barrel in the same horizontal direction.

14. The apparatus according to claim 1, wherein the barrel is spring-loaded to a frame of the device such that withdrawing the pusher moves the barrel to one of the loading position and the extruding position.

* * * * *